UNITED STATES PATENT OFFICE.

FREDERICK PASCHKE, OF LONDON, ENGLAND, ASSIGNOR TO SAFETY CELLULOID COMPANY LIMITED, OF LONDON, ENGLAND.

MANUFACTURE OF CELLULOSE ACETATE.

1,082,167.  Specification of Letters Patent.  Patented Dec. 23, 1913.

No Drawing.  Application filed May 26, 1913. Serial No. 769,958.

*To all whom it may concern:*

Be it known that I, FREDERICK PASCHKE, a subject of the Emperor of Germany, and residing at 8 Fellows road, Chalk Farm, London, N. W., England, have invented certain new and useful Improvements in the Manufacture of Cellulose Acetate, of which the following is a specification.

This invention relates to a process for the manufacture of cellulose acetate of the kind wherein acetic anhydrid and glacial acetic acid are used in combination with a condensing agent for dissolving the cellulose. In such processes as hitherto adopted it has been necessary to employ an unduly large proportion of acetic anhydrid owing to the nature of the condensing agents employed and by reason of the high cost of this reagent (acetic anhydrid) the cost of manufacture has been correspondingly increased. Moreover, since a great quantity of heat is liberated in the re-action, parts of the reaction mass are liable to become overheated and spoiled while in other parts the re-action is not complete.

The object of the present invention is to devise a process which shall be free from the above disadvantages and according to the invention a condensing agent is employed consisting of a copper salt which is anhydrous or which contains only a small quantity of water of crystallization such as anhydrous copper sulfate, nitrate of copper, chlorid of copper or a mixture of acetate of copper with nitrate of copper. By employing such a copper salt as the condensing agent it is possible to allow the re-action to take place in a vessel formed of or lined with copper since this metal would not be attacked by the copper salts above mentioned and thus the heat liberated during the re-action may be conducted away more rapidly since copper as is known is a good conductor of heat so that the re-action is thereby rendered more uniform and the risk of over-heating is obviated. By this means also it is possible to reduce very considerably the amount of acetic anhydrid required in the liquid used for dissolving the cellulose and thus correspondingly reduce the cost of manufacture. The product of the re-action is a clear viscous liquid of regular quality and in order to prevent the same from forming a gelatinous mass concentrated acetic acid of about 80 to 90 per cent. strength is added and the whole well mixed whereupon the resultant clear solution is poured into earthen jars and deacetylation carried out by passing chlorin into it until the cellulose acetate contains only 50 to 55 per cent. of acetic acid, the reaction being accelerated if desired by raising the temperature of the re-acting substances although the temperature employed should not exceed 60° C. When this stage is reached the mass is precipitated with water or carbon tetrachlorid and may be employed for example, in the manufacture of films which are exceedingly flexible or of celluloid and it is very uniform in quality and of such a character that it will readily absorb colors.

As one example of a specific method of carrying the invention into effect the following may be given, viz:—5 kilograms of anhydrous sulfate of copper are added to 1300 kilograms of a mixture of 30 per cent. by weight of acetic anhydrid and 70 per cent. by weight of glacial acetic acid, that is, the copper salt may be from 0.35 to 0.5 per cent. of the mixture of acetic anhydrid and glacial acetic acid. 200 kilogrs. of cellulose are dissolved in this solution, the re-action being allowed to take place, for example, in an iron vessel lined with copper and the temperature being kept at 70° C. When the re-action is complete 600 kilograms of concentrated acetic acid of 80 to 90 per cent. strength is added to the viscous liquid whereupon the solution is poured into earthenware vessels and chlorin passed in until the cellulose acetate is soluble in acetic ether or acetone and when this stage is reached the cellulose acetate contains 50 to 55 per cent. of acetic acid and it is convenient to determine the progress of the re-action by observing the corresponding decrease of rotation in a polariscope. Thus, in the course of the deacetylation the rotation drops from $(a)$ $d$—21 to $(a)$ $d$—7, this point being normally reached when about 4 kilograms of chlorin have been passed in. Water or carbon tetrachlorid is then slowly added to the liquid so as to obtain a flocculent precipitate. In some cases the anhydrous copper sulfate may be replaced by the chlorid or nitrate of copper. Thus, in the example given above the 5 kilograms of anhydrous sulfate of copper may be replaced by six kilograms of chlorid of copper or by six kilograms of nitrate of copper or by four kilograms of acetate of copper mixed with three kilograms of nitrate of copper. These substitutes for anhydrous copper sulfate should be as free from water as possible.

It is to be understood that the hereinbefore described method of carrying the invention into effect is given by way of example only and the proportions of the various constituents employed in the re-action may be suitably modified as may be found most convenient in practice.

Having now described my invention, what I claim as new and desire to secure by Letters Patent is:—

1. A process for the production of cellulose acetate which consists in dissolving cellulose in a mixture of acetic anhydrid, glacial acetic acid and a condensing agent consisting of a suitable anhydrous copper salt.

2. A process for the production of cellulose acetate which consists in dissolving cellulose in a mixture of acetic anhydrid, glacial acetic acid and a condensing agent consisting of a suitable anhydrous copper salt, adding acetic acid to the solution of cellulose acetate and deacetylizing the solution by passing chlorin into the same.

3. A process for the production of cellulose acetate which consists in dissolving the cellulose in a liquid consisting of substantially 30 parts by weight of acetic anhydrid, 70 parts by weight of glacial acetic acid and 0.35 to 0.5 parts by weight of anhydrous copper sulfate.

4. A process for the production of cellulose acetate which consists in dissolving cellulose in a liquid consisting of substantially 30 parts by weight of acetic anhydrid, 70 parts by weight of glacial acetic acid and 0.35 to 0.5 parts by weight of anhydrous copper sulfate, adding acetic acid of from 80 to 90 per cent. strength to the solution of cellulose acetate and passing chlorin through the resultant solution until the cellulose acetate contains only 50 to 55 per cent. of acetic acid.

In testimony whereof I have signed my name to this specification in the presence of two subscribing witnesses.

FREDERICK PASCHKE.

Witnesses:
C. J. REDFERN,
WILLIAM BARTON.